United States Patent
Huang (10) Patent No.: US 9,535,255 B2
(45) Date of Patent: Jan. 3, 2017

(54) AUTOSTEREOSCOPIC PROJECTION DEVICE AND DISPLAY APPARATUS

(71) Applicant: DELTA ELECTRONICS, INC., Taoyuan Hsien (TW)

(72) Inventor: June-Jei Huang, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 118 days.

(21) Appl. No.: 14/259,872

(22) Filed: Apr. 23, 2014

(65) Prior Publication Data

US 2015/0131058 A1    May 14, 2015

(30) Foreign Application Priority Data

Nov. 12, 2013    (TW) .............................. 102140972 A (51) Int. Cl.
  *G03B 21/28*    (2006.01)
  *G02B 27/22*    (2006.01)
  *G03B 21/20*    (2006.01)

(52) U.S. Cl.
  CPC ......... *G02B 27/2214* (2013.01); *G03B 21/208* (2013.01); *G03B 21/2033* (2013.01); *G03B 21/28* (2013.01)

(58) Field of Classification Search
  CPC .. H04N 9/3117; H04N 9/3155; H04N 9/3161; H04N 9/3197; G03B 21/2033; G03B 21/206; G03B 21/208; G03B 21/28
  USPC ................ 353/7, 31, 33, 37, 38, 81, 98, 102
  See application file for complete search history.

(56) References Cited

U.S. PATENT DOCUMENTS

| 2002/0180932 A1* | 12/2002 | Shimizu | G02B 27/283 353/20 |
| 2003/0039036 A1* | 2/2003 | Kruschwitz | G02B 27/0927 359/707 |
| 2005/0012902 A1* | 1/2005 | Kim | G02B 26/008 353/8 |
| 2007/0058143 A1* | 3/2007 | Penn | G03B 21/2033 353/102 |

(Continued)

FOREIGN PATENT DOCUMENTS

| EP | 1976303 A1 | 10/2008 |
| TW | 200931159 A | 7/2009 |

(Continued)

*Primary Examiner* — Sultan Chowdhury
(74) *Attorney, Agent, or Firm* — Muncy, Geissler, Olds & Lowe, P.C.

(57) ABSTRACT

An autostereoscopic projection device comprises a light source providing a light, a light scanning module, a light transmitting module, a light combining module including a first light combining element, a spatial light modulator module including a first spatial light modulator element, and a lens. The light scanning module includes a reflective surface and an actuating device capable of deflecting the reflective surface. The normal vector of an incident surface of the first light combining element is coplanar with the normal vector of a reflective surface of the first spatial light modulator element, and the coplanar plane is perpendicular to a disposition plane of the projection device. The light provided by the light source module is transmitted through the light scanning module, the light transmitting module, the light combining module and the spatial light modulator module sequentially and then leaves the projection device through the lens.

19 Claims, 8 Drawing Sheets

(56) References Cited

U.S. PATENT DOCUMENTS

| | | | |
|---|---|---|---|
| 2007/0165189 A1* | 7/2007 | Kawase | G03B 21/00 353/31 |
| 2007/0296920 A1* | 12/2007 | Mezouari | H04N 13/0404 353/7 |
| 2009/0046140 A1* | 2/2009 | Lashmet | G09G 3/002 348/51 |
| 2009/0073527 A1* | 3/2009 | Destain | G02B 26/0883 359/204.1 |
| 2009/0141242 A1 | 6/2009 | Silverstein et al. | |
| 2009/0195644 A1* | 8/2009 | Wakabayashi | G02B 26/085 348/51 |
| 2010/0110166 A1 | 5/2010 | Chang | |
| 2013/0155336 A1 | 6/2013 | Nagashima | |

FOREIGN PATENT DOCUMENTS

| | | |
|---|---|---|
| TW | 201019031 A | 5/2010 |
| TW | 201214014 A1 | 4/2012 |

* cited by examiner

AUTOSTEREOSCOPIC PROJECTION DEVICE AND DISPLAY APPARATUS

CROSS REFERENCE TO RELATED APPLICATIONS

This Non-provisional application claims priority under 35 U.S.C. §119(a) on Patent Application No(s). 102140972 filed in Taiwan, Republic of China on Nov. 12, 2013, the entire contents of which are hereby incorporated by reference.

BACKGROUND OF THE INVENTION

Field of Invention

The invention relates to an optical device and, in particular, to an autostereoscopic projection device.

Related Art

Recently, with the progress of the stereoscopic display technology, many stereoscopic products, such as stereoscopic movies and stereoscopic TVs, are produced for various commercial applications. The basic concept of the stereoscopic display technology is to transmit the left-eye images and the right-eye images with different viewing angles to the left eye and right eye of the viewer respectively, and both of these 2D images are then combined in the viewer's brain to give the perception of 3D depth while the viewer perceive the stereoscopic images.

The stereoscopic display technology can be divided into the glasses type, head-mounted type and autostereoscopic type according to the applied tools. Especially, the autostereoscopic display technology attracts more attention from industries because it needn't stereoscopic glasses or head-mounted devices but can provide 3D images to the naked eyes of the viewers.

A conventional autostereoscopic projection device cooperates with a plurality of projection apparatuses (may be disposed in an array) so that the left eye and the right eye can view different images. However, this kind of design causes a considerable difficulty to the compactness of the projection device, and the optical path design among the projection apparatuses will become more complicated. Another design for achieving the same purpose is to transmit the images of different angles to the left eye and right eye respectively at different timings by the liquid crystal (LC) switch elements. Although such design can reduce the volume of the projection device, more LC switch elements need to be used for the more viewing angles. For example, if 16 viewing angles are provided, four stages of two-phase LC switches are needed. Because the conversion efficiency ratio of each of the two-phase LC switches is about 90%, the actual total conversion efficiency ratio drops off to about 65.6% after the four-time LC switching. Accordingly, this design of using the switch elements not only complicates the control but also reduces the total imaging efficiency.

Therefore, it is an important subject to provide an autostereoscopic projection device which has simpler optical path design, simpler control mechanism, better conversion efficiency, and less volume and weight.

SUMMARY OF THE INVENTION

In view of the foregoing subject, an objective of the invention is to provide an autostereoscopic projection device which has simpler optical path design, simpler control mechanism, better conversion efficiency, and less volume and weight.

To achieve the above objective, an autostereoscopic projection device according to the invention comprises a light source, a light scanning module, a light transmitting module, a light combining module, a spatial light modulator module and a lens.

The light source provides a light. The light scanning module includes an actuating device and a reflective surface, and the actuating device capable of deflecting the reflective surface. The light combining module includes a first light combining element. The spatial light modulator module includes a first spatial light modulator element. The normal vector of an incident surface of the first light combining element is coplanar with the normal vector of a reflective surface of the first spatial light modulator element, and the coplanar plane is perpendicular to a disposition plane of the projection device.

The light provided by the light source module is transmitted through the light scanning module, the light transmitting module, the light combining module and the spatial light modulator module sequentially and then leaves the projection device through the lens.

In one embodiment, the light source module is a laser array or a laser unit.

In one embodiment, the autostereoscopic projection device further comprises a light uniforming module disposed between the light scanning module and the light source module. The light is transmitted sequentially through the light uniforming module and the light scanning module.

In one embodiment, the light combining module further includes a second light combining element, and the spatial light modulator module further includes a second spatial light modulator element and a third spatial light modulator element.

After entering into the second spatial light modulator element and the third spatial light modulator element, the light is transmitted to the first light combining element by the second light combining element along the same direction.

In one embodiment, the light scanning module is a voice coil motor, polygon mirror, or MEMS lens.

In one embodiment, the spatial light modulator element is a digital micromirror device (DMD).

In one embodiment, the actuating device of the light scanning module deflects the reflective surface for different angles at different timings to form a plurality of different viewing regions.

In one embodiment, the light combining element is a total reflection prism.

In one embodiment, the light transmitting module is a reflective mirror.

A display device according to the invention comprises any of the above-mentioned autostereoscopic projection devices and a display screen. The autostereoscopic projection device forms a plurality of viewing regions on the display screen.

In one embodiment, the light source module is a laser array or a laser unit.

In one embodiment, the autostereoscopic projection device further comprises a light uniforming module disposed between the light scanning module and the light source module. The light is transmitted sequentially through the light uniforming module and the light scanning module.

In one embodiment, the light combining module further includes a second light combining element, the spatial light modulator module further includes a second spatial light modulator element and a third spatial light modulator element, after entering into the second spatial light modulator element and the third spatial light modulator element, the light is transmitted to the first light combining element by the second light combining element along the same direction.

In one embodiment, the light scanning module is a voice coil motor, polygon mirror, or MEMS lens.

In one embodiment, the spatial light modulator element is a digital micromirror device (DMD).

In one embodiment, the actuating device of the light scanning module deflects the reflective surface for different angles at different timings to form a plurality of different viewing regions.

In one embodiment, the light combining element is a total reflection prism.

In one embodiment, the display screen includes a double lenticular lens, and the double lenticular lens includes two lenticular lens layers and a 2D diffuser disposed between the lenticular lens layers.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

First of all, in the following embodiments and figures, the illustrated elements which are not directly related to the invention are omitted and not shown, and the size relation between the elements is just for the easier understanding but not for limiting the actual size ratio.

The projection device of this embodiment can be a digital light processing (DLP) projection display, a liquid crystal projection display, or a liquid crystal on silicon (LCOS) projection display, for example.

Figure 1:
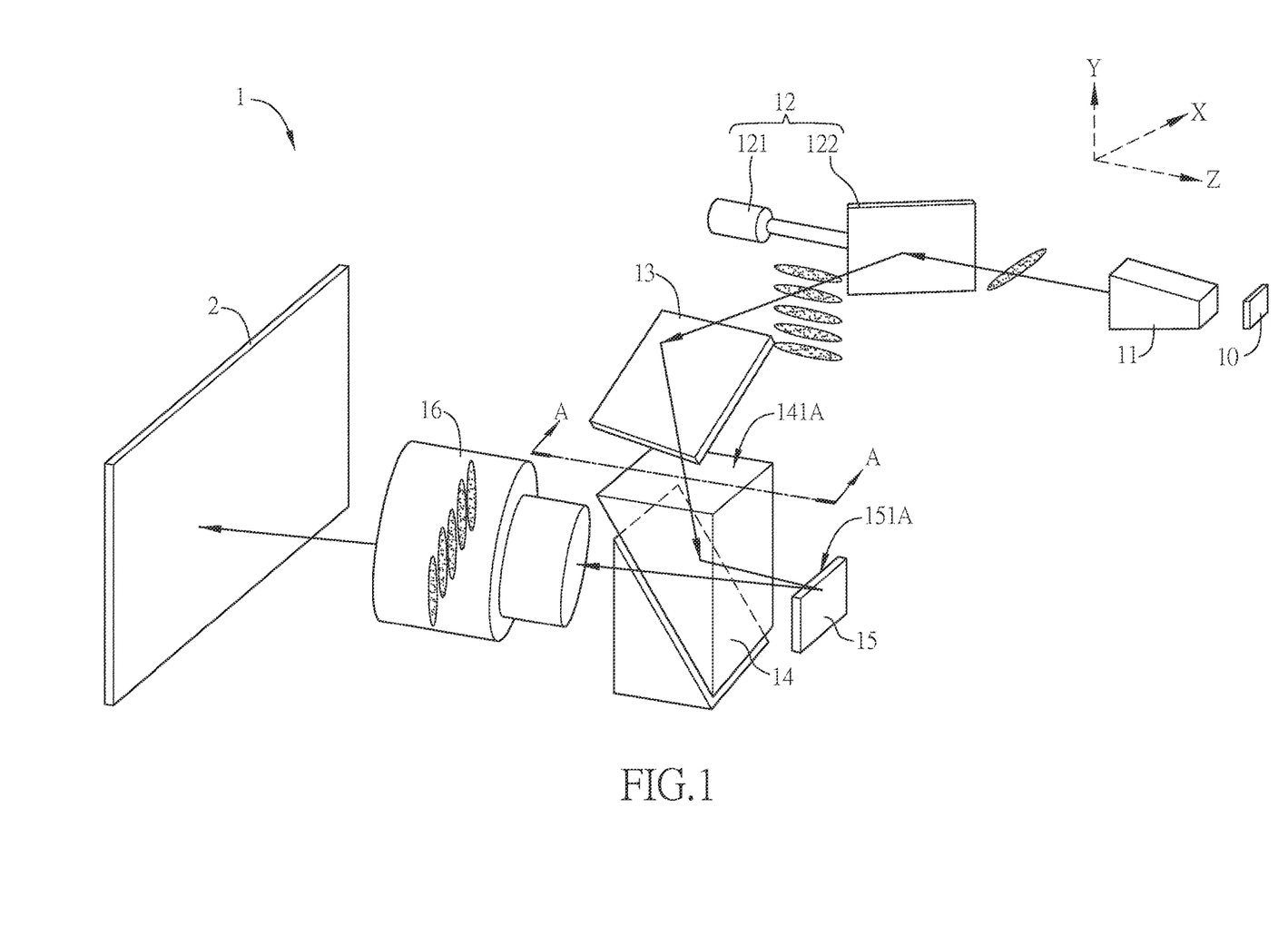
FIG. 1 is a schematic diagram of an autostereoscopic projection device according to a first embodiment of the invention.
Figure 2:
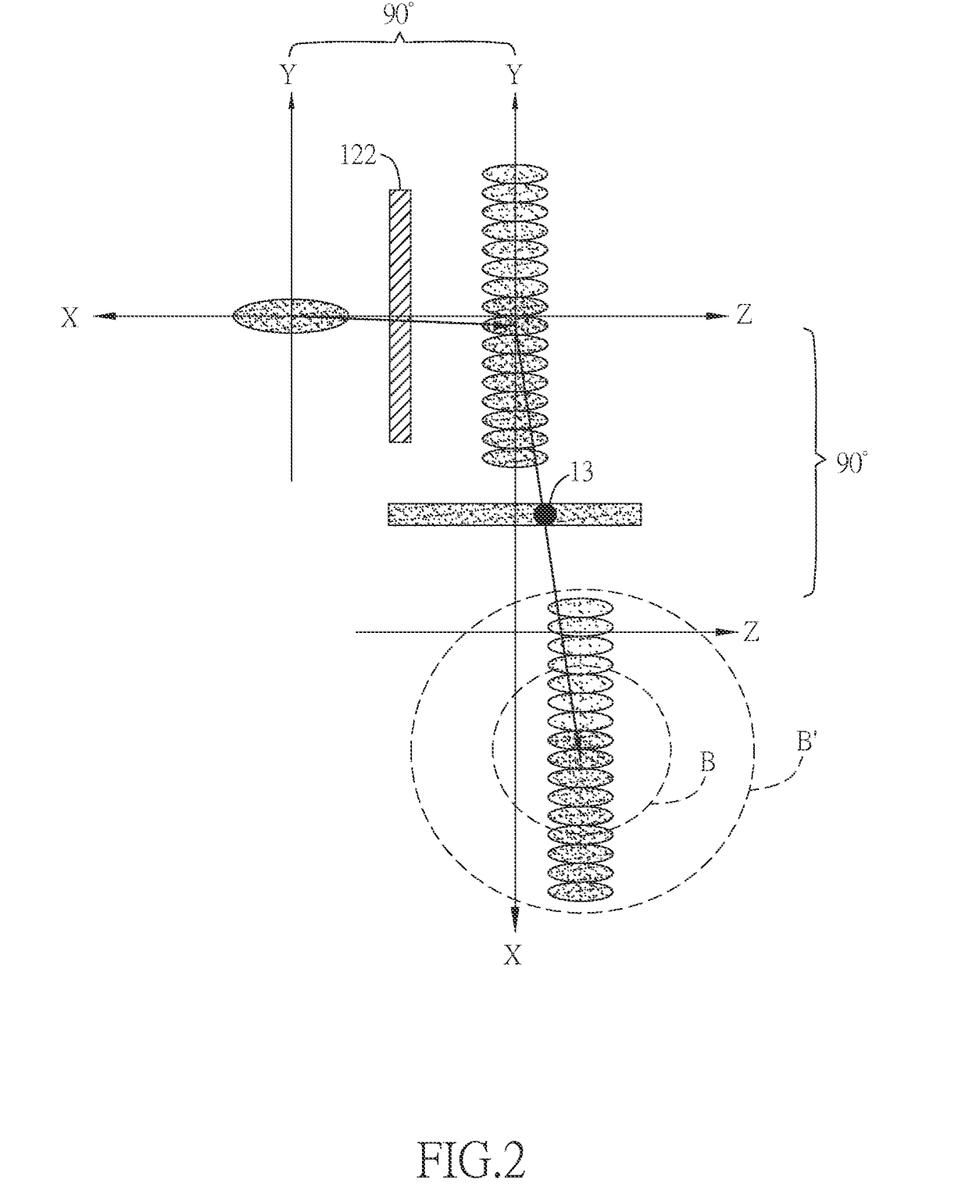
FIG. 2 is a schematic diagram of the imaging of the autostereoscopic projection device in FIG. 1.
Figure 3:
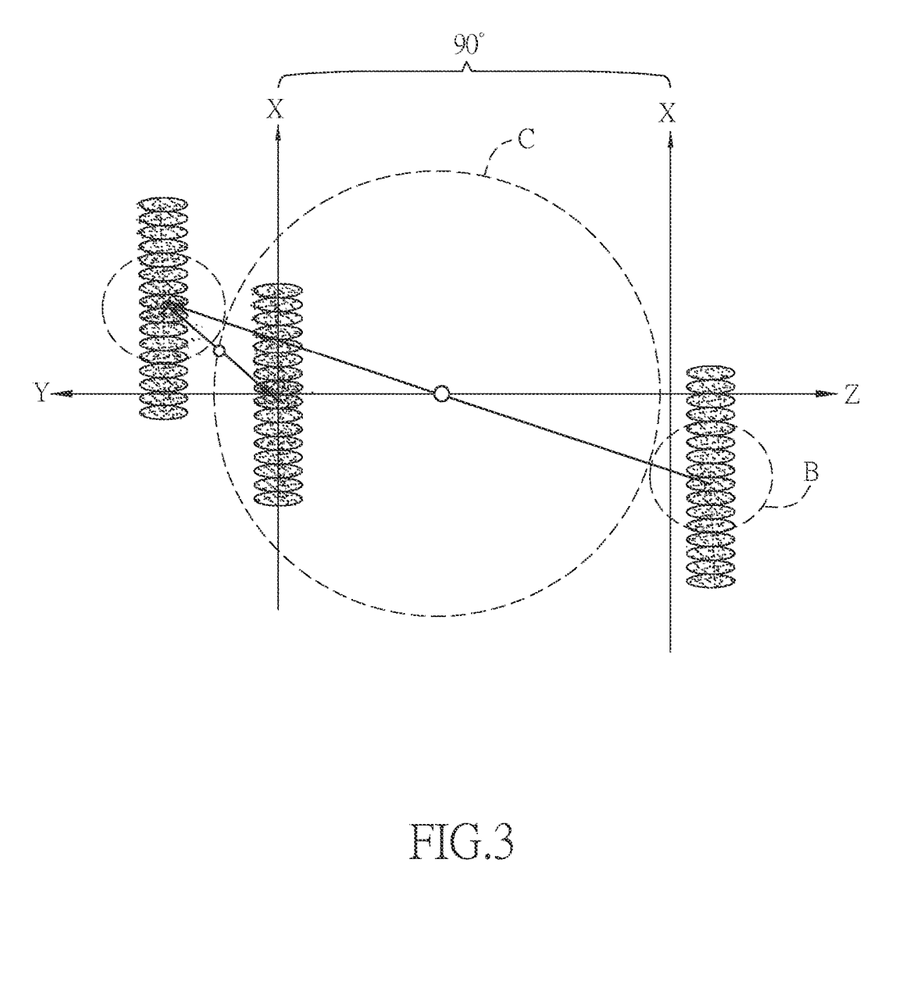
FIG. 3 is another schematic diagram of the imaging of the autostereoscopic projection device in FIG. 1.
Figure 4:
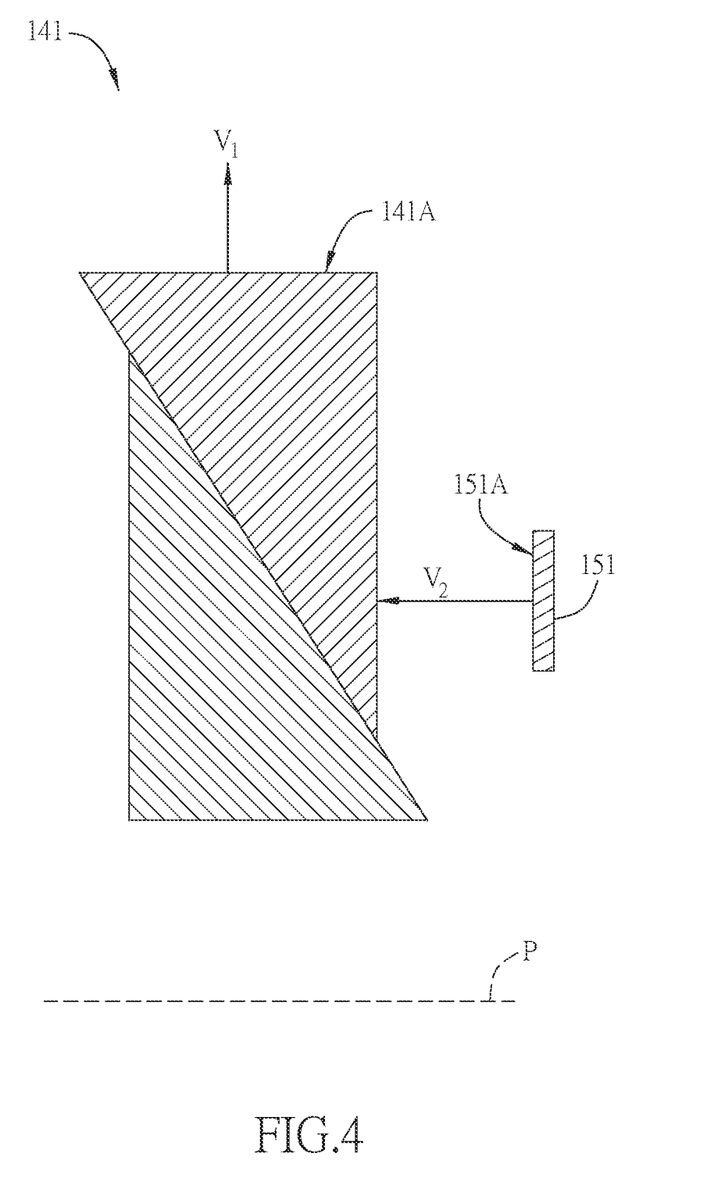
FIG. 4 is a schematic sectional diagram taken along the line A-A in FIG. 1.
Figure 5:
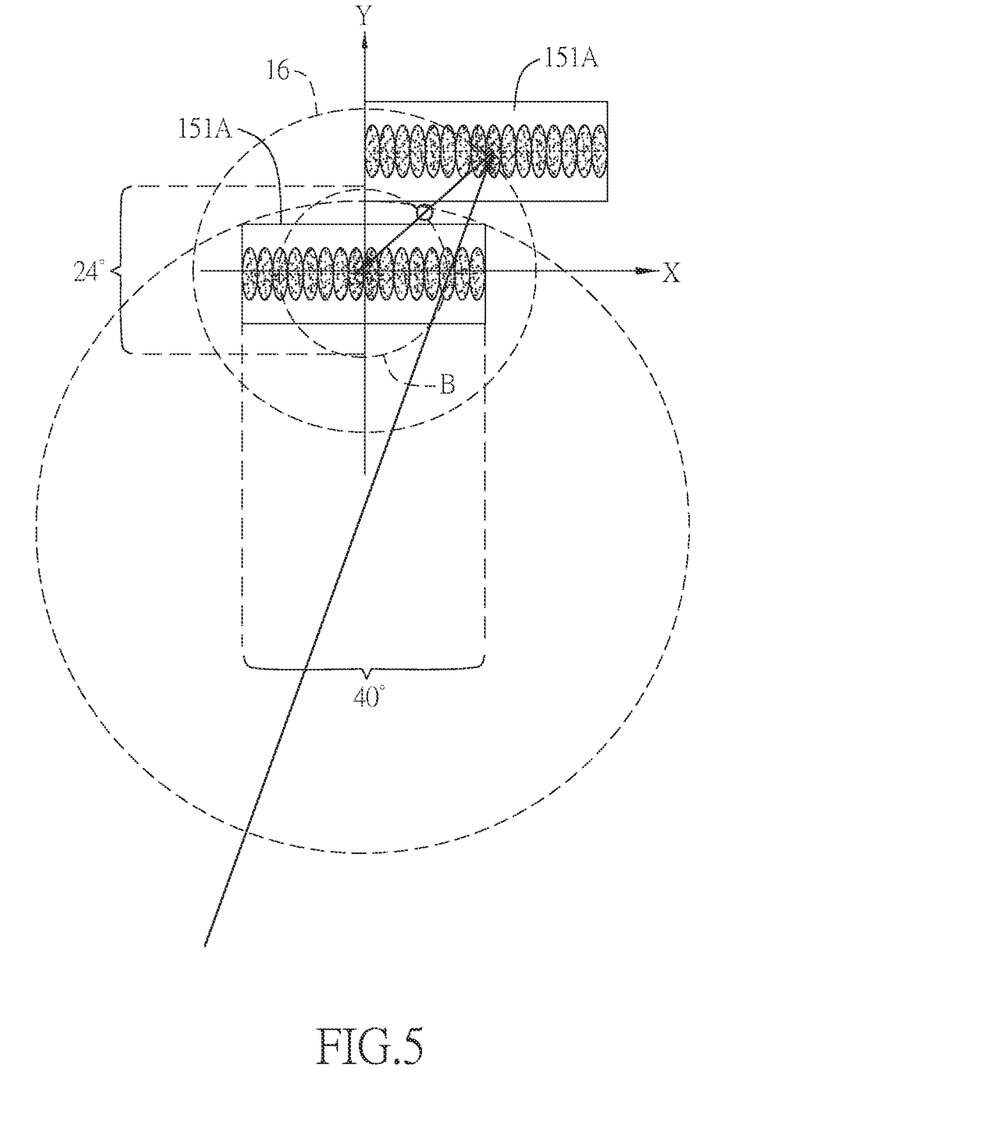
FIG. 5 is another schematic diagram of the imaging of the autostereoscopic projection device in FIG. 1.

FIG. 1 is a schematic diagram of an autostereoscopic projection device according to a first embodiment of the invention, FIG. 2 is a schematic diagram of the imaging of the autostereoscopic projection device in FIG. 1, FIGS. 3 and 5 are other schematic diagrams of the imaging of the autostereoscopic projection device in FIG. 1, and FIG. 4 is a schematic sectional diagram taken along the line A-A in FIG. 1.

The projection device 1 of this embodiment at least includes a light source module 10, a light scanning module 12, a light transmitting module 13, a light combining module 14, a spatial light modulator module 15 and a lens 16. The light emitted by the light source module 10 is transmitted through the light scanning module 12, the light transmitting module 13, the light combining module 14 and the spatial light modulator module 15 sequentially, and then leaves the projection device 1 through the lens 16.

The light source module 10 is disposed on a side of the light scanning module 12 and can provide light. The light source module 10 can be a laser array or laser unit.

Besides, this embodiment can further include a light uniforming module 11 whereby the light can be uniformed into a bar-like light source entering into the light scanning module 12. The light uniforming module 11 can be disposed between the light scanning module 12 and the light source module 10. The light is transmitted sequentially through the light uniforming module 11 and the light scanning module 12. The light uniforming module 11 can be an integration rod or a light tunnel for example.

The light scanning module 12 includes an actuating device 121 and a reflective surface, and the actuating device 122 is capable of deflecting the reflective surface 122. The light scanning module 12 can include a voice coil motor, polygon mirror, or MEMS lens, or their combinations.

The voice coil motor of this embodiment can be a galvano mirror, which further includes a movable coil (not shown) disposed within a magnetic field. Thereby, the movable coil can be driven by the current-induced electromagnetic force to rotate the shaft so as to deflect the reflective mirror that is connected to the shaft. Therefore, if the light scanning module 12 is a galvano mirror, the angle of the reflective mirror can be adjusted by controlling the current value of the galvano mirror.

The angle of the reflective surface 122 in this embodiment can be deflected for 20°~30°. If the bar-like light provided by the light source module 10 needs to be projected into 16 bar-like beams with different angles, the reflective surface can be deflected for 2.5° every time. In other embodiments, the bar-like light also can be projected into 32 different angles to form 32 viewing regions. In other words, the number of the projected angles can be adjusted according to the number of the viewing regions.

Accordingly, the actuating device 121 of the light scanning module 12 can make the reflective surface 122 deflect to different angles at different timings to form a plurality of viewing regions. Therefore, the light of the light source module 12 on the X-Y coordinate plane can be transmitted to the Y-Z coordinate plane (as shown in FIG. 2) so as to be scanned and imaged on the Y-axis direction.

The light transmitting module 13 is a reflective mirror disposed between the light combining module 14 and the light scanning module 12. Because the light transmitting module 13 and the light scanning module 12 have an included angle of 45°, the light will be deflected for 90° when transmitted from the light scanning module 12 to the light combining module 14, and can be imaged on the X-Z coordinate plane (as shown in FIG. 2).

The light combining module 14 can include a first light combining element 141, which can be a total reflection prism. The first light combining element 141 can reflect the light of the incident angle greater than a predetermined angle (e.g. 40°) and can be passed through by the light of the incident angle less than the predetermined angle. Therefore, the light transmitted by the light transmitting module 13 will be reflected and transmitted to the spatial light modulator module 15.

It can be known from FIG. 3 that the light can be imaged to the X-Y coordinate plane (the coordinates on the left of the figure) from the X-Z coordinate plane (the coordinates on the right of the figure) of the first light combining element 141 and then transmitted to the first light combining element 141 again. In this case, the incident angle of the light is less than the predetermined angle so the light will pass through the first light combining element 141. The region C in the figure represents the incident region through which the light can enter into the first light combining element 141 and can be transmitted to the projection lens. The region C represents the angle of the light that can pass through the first light combining element 141 (i.e. the incident angle less than the predetermined angle), so the light that is imaged to the portion outside the region C will be reflected (i.e. the incident angle greater than the predetermined angle).

The spatial light modulator module 15 includes a first spatial light modulator element 151, which can be a digital micromirror device (DMD) for example.

As an embodiment, if the first spatial light modulator element 151 is a DMD, the DMD with the deflection range of 12°~−12° (the region denoted by the dotted line B in FIG. 5 represents the conventional imaging range that is within 24°) can control or modulate the incident light by switch elements. When the DMD is at the "on" state, the light transmitted by the first light combining element 141 will be reflected into the first light combining element 141 again and then enter into the lens 16 to be imaged on the display screen 2. Oppositely, when the DMD is at the "off" state, the light transmitted by the first light combining element 141 will not be imaged on the display screen 2.

As shown in FIG. 4, in this embodiment, the normal vector V1 of the incident surface 141A of the first light combining element 141 is coplanar with the normal vector V2 of the reflective surface 151A of the first spatial light modulator element 151, and the coplanar plane is perpendicular to the disposition plane P of the projection device 1.

Furthermore, as shown in FIGS. 2 and 5, the first light combining element 141 and the first spatial light modulator element 151 in this embodiment are disposed along the same direction, not like the conventional projection device where the first light combining element 141 and the first spatial light modulator element 151 are disposed by an included angle of 45°. Therefore, this embodiment has the advantage of expanding the imaging range B of the spatial light modulator to the range B' (the imaging range is expanded from 24° to 40° when the DMD is used as the spatial light modulator element for example), and therefore the etendue (the product of the area and the solid angle) of the total light of the projection device can be increased so that a larger amount of the light and more viewing regions for the imaging on the display screen 2 can be obtained.

Figure 6:
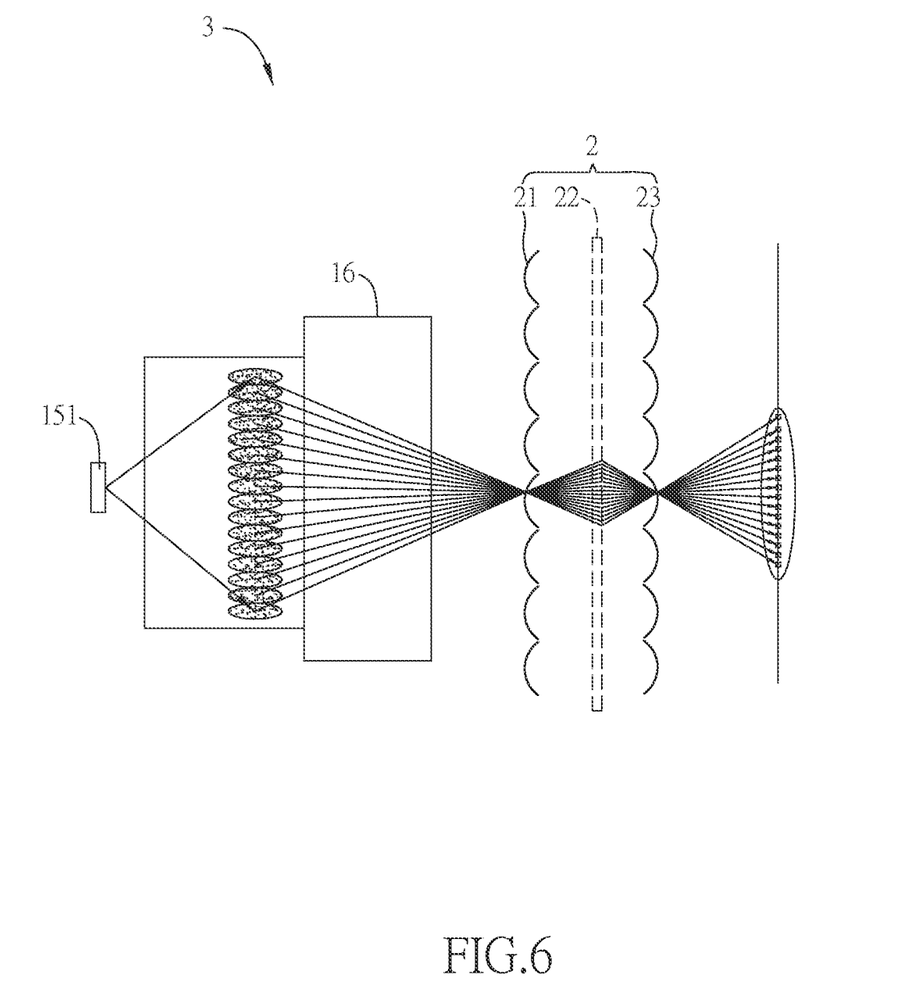
FIG. 6 is a schematic diagram of a display apparatus according to an embodiment of the invention.

FIG. 6 is a schematic diagram of a display apparatus according to an embodiment of the invention.

The display apparatus 3 of this embodiment includes the above-mentioned projection device 1 and the display screen 2. The projection device 1 can form a plurality of viewing regions on the display screen 2 so that the left eye and right eye of the viewer can see the adjacent viewing regions, respectively, and therefore the parallax effect can be provided and the 3D images can be generated in the viewer's brain.

To be noted, FIG. 6 just shows the relative position between the first spatial light modulator element 151 and the lens 16 of the projection device 1 for the clear understanding, but doesn't show the actual disposition. This is just for clearly understanding the imaging relation between the projection device 1 and the display screen 2.

The display screen 2 of this embodiment further includes a double lenticular lens. The double lenticular lens includes two lenticular lens layers 21, 23 and a 2D diffuser disposed between the lenticular lens layers 21, 23. In detail, the light outputted from the projection device 1 will be condensed by the lenticular lens layer 21 to be imaged on the 2D diffuser 22, and be then imaged again to the viewing plane of the viewer through the lenticular lens layer 23.

The lenticular lens layers 21, 23 are made by the transparent material of high refractive index, such as UV-cured resin, thermosetting resin or plastic material. Moreover, the lenticular portion of the lenticular lens layers 21, 23 can have a circular, elliptic, triangular or rectangular pattern.

To be noted, the lenticular lens layers 21, 23, the 2D diffuser 22, and the curvatures and intervals thereof shown in the figures are just for the illustration, and can be adjusted according to the practical situation, such as the interval between the projection device 1 and the display screen 2.

Figure 7A:
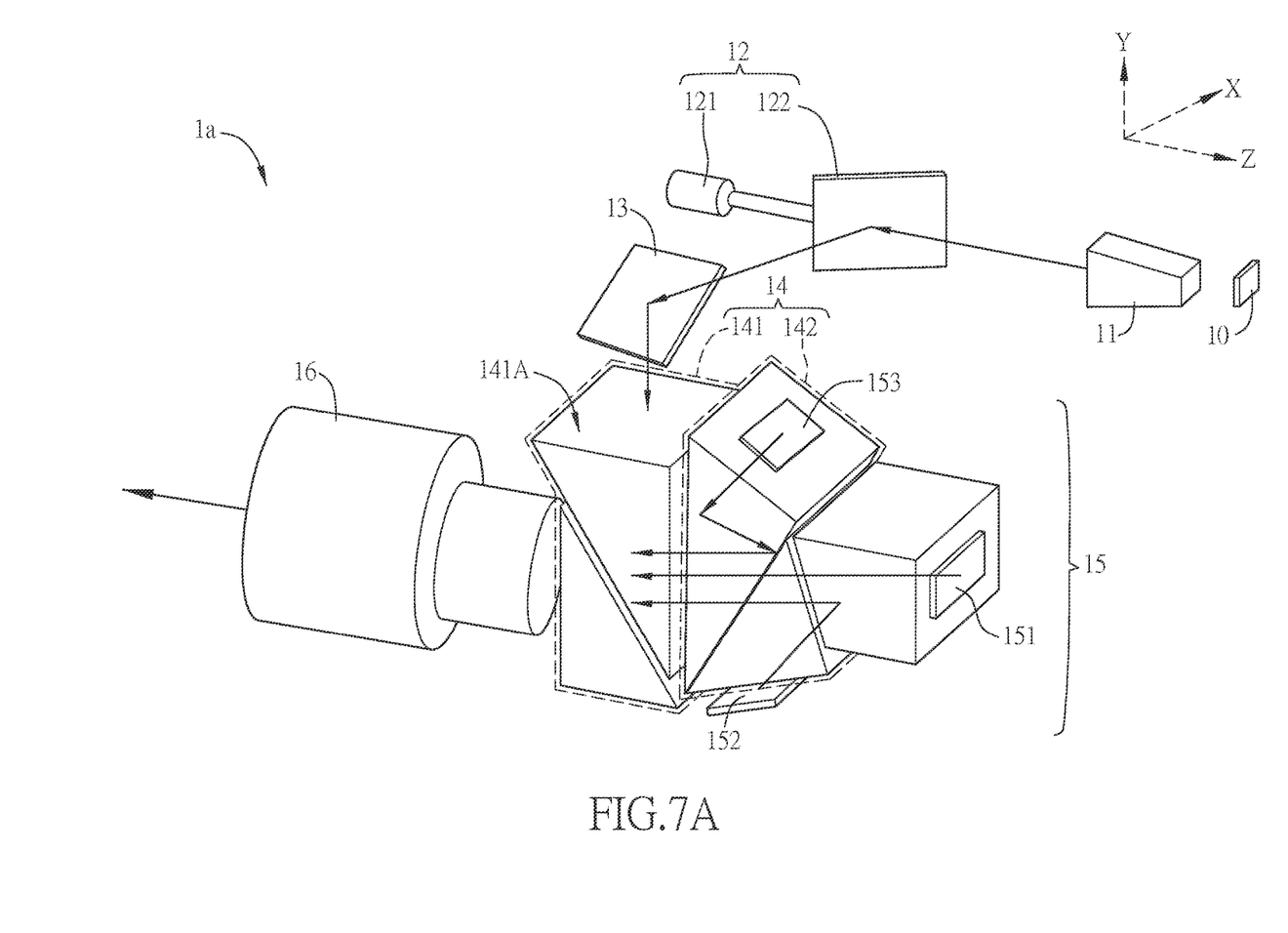
FIG. 7A is a schematic diagram of an autostereoscopic projection device according to a second embodiment of the invention.
Figure 7B:
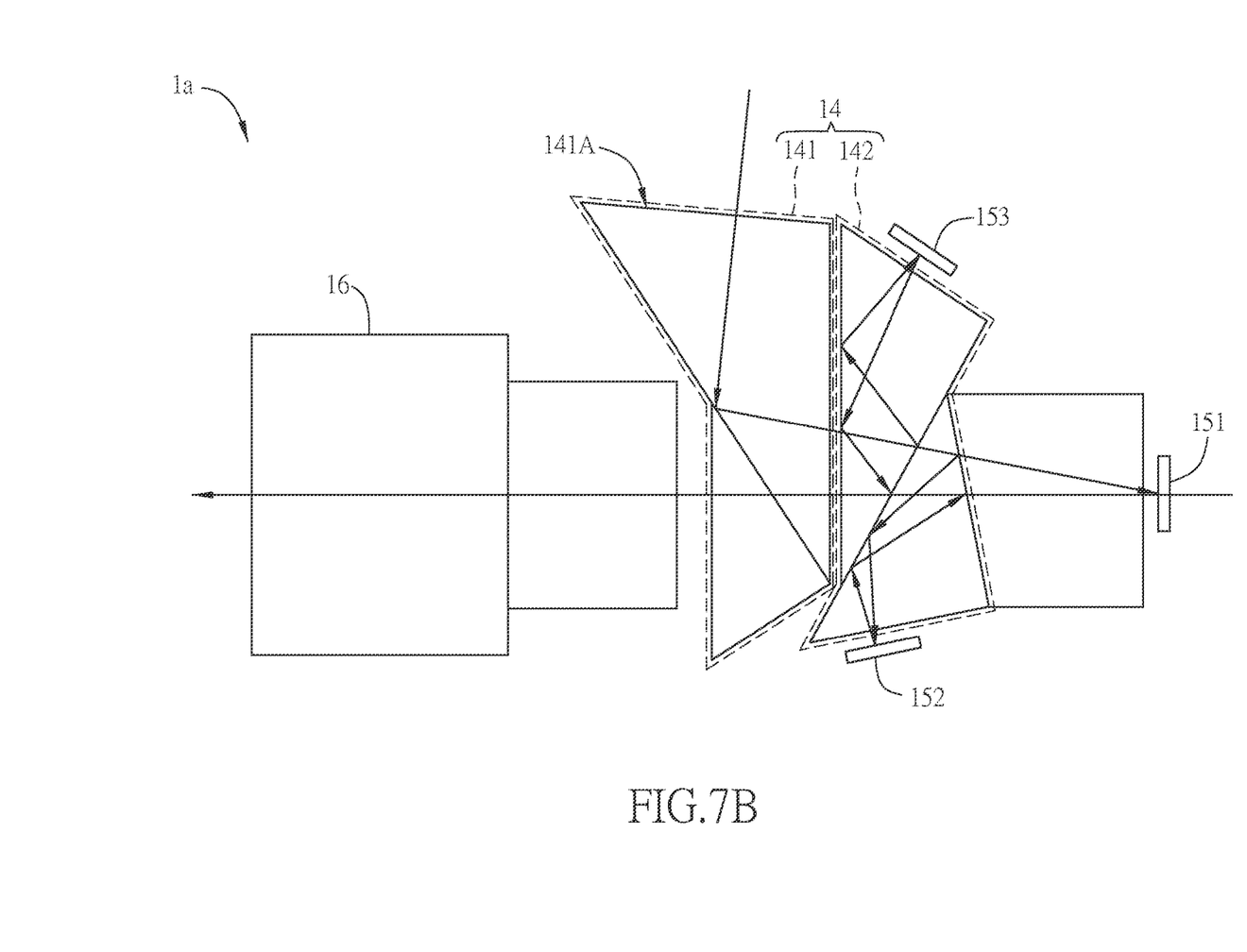
FIG. 7B is a schematic side view of the autostereoscopic projection device in FIG. 7A.

FIG. 7A is a schematic diagram of an autostereoscopic projection device according to a second embodiment of the invention, and FIG. 7B is a schematic side view of the autostereoscopic projection device in FIG. 7A.

Different from the 1-chip projection device of the first embodiment (FIG. 1), the projection device of this embodiment is a 3-chip digital optical processing device.

In this embodiment, in addition to the first light combining element 141, the light combining module 14 can further include a second light combining element 142, which can be a total reflection prism for example.

Besides, in addition to the first spatial light modulator element 151, the spatial light modulator module 15 can further include a second spatial light modulator element 152 and a third spatial light modulator element 153, both of which can be a digital micromirror device (DMD).

The light emitted by the light source module 10 is transmitted through the light scanning module 12, the light transmitting module 13, the light combining module 14 and the spatial light modulator module 15 sequentially, and then leaves the projection device 1 through the lens 16.

In detail, by the first and second light combining elements 141 and 142 of the light combining module 14, the light will be transmitted to the first, second and third spatial light modulator elements 151, 152, 153 (according to the incident angle on the light combining module). Then, after entering into the first, second and third spatial light modulator elements 151, 152, 153, the light can be reflected by the first, second and third spatial light modulator elements 151, 152, 153 to enter into the second light combining elements 142 again and is then transmitted to the first light combining elements 141 through the second light combining elements 142.

Besides, the light beams outputted from the second light combining elements 142 travel along the same direction. In other words, the light that is reflected by the first, second and third spatial light modulator elements 151, 152, 153 to enter into the second light combining elements 142 will enter into the lens 16 along the same direction and is then imaged on the display screen 2.

The relation between the second and third spatial light modulator elements 152, 153 and other elements is similar to the case of the first spatial light modulator elements 151, and therefore it is not described here for conciseness.

In summary, in the autostereoscopic projection device according to the invention, the light scanning module can transmit the light provided by the light source module to the spatial light modulator module in different angles at different timings. Therefore, the purpose of the conventional art where different viewing regions are produced at different timings by a plurality of light sources or switch elements can be achieved by the invention so that the conventional art can be replaced by the invention. Besides, the invention is capable of providing an autostereoscopic projection device which has simpler optical path design, simpler control mechanism, better conversion efficiency, and less volume and weight.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An autostereoscopic projection device, comprising:
   a light source module providing a light;
   a light scanning module including an actuating device and a reflective surface, and the actuating device capable of deflecting the reflective surface;
   a light transmitting module;
   a light combining module including a first light combining element;
   a spatial light modulator module including a first spatial light modulator element, wherein the normal vector of an incident surface of the first light combining element is coplanar with the normal vector of a reflective surface of the first spatial light modulator element, and the coplanar plane is perpendicular to a disposition plane of the projection device; and
   a lens, wherein the light provided by the light source module is transmitted through the light scanning module, the light transmitting module, the light combining module and the spatial light modulator module sequentially and then leaves the projection device through the lens,
   wherein the light transmitting module is a reflective mirror disposed between the light combining module and the light scanning module,
   wherein the light of the light source module on the X-Y coordinate plane transmitted along the Z-axis direction is transmitted to the Y-Z coordinate plane by the light scanning module so as to be scanned and imaged on the Y-axis direction, and is further transmitted to the X-Z coordinate lane by the light transmitting module so as to be scanned and imaged on the X-axis direction.

2. The autostereoscopic projection device as recited in claim 1, wherein the light source module is a laser array or a laser unit.

3. The autostereoscopic projection device as recited in claim 1, further comprising:
   a light uniforming module disposed between the light scanning module and the light source module, wherein the light is transmitted sequentially through the light uniforming module and the light scanning module.

4. The autostereoscopic projection device as recited in claim 1, wherein the light combining module further includes a second light combining element, the spatial light modulator module further includes a second spatial light modulator element and a third spatial light modulator element, after entering into the second spatial light modulator element and the third spatial light modulator element, the light is transmitted to the first light combining element by the second light combining element along the same direction.

5. The autostereoscopic projection device as recited in claim 1, wherein the light scanning module is a voice coil motor, polygon mirror, or MEMS lens.

6. The autostereoscopic projection device as recited in claim 1, wherein the spatial light modulator element is a digital micromirror device (DMD).

7. The autostereoscopic projection device as recited in claim 4, wherein the spatial light modulator element is a digital micromirror device (DMD).

8. The autostereoscopic projection device as recited in claim 1, wherein the actuating device of the light scanning module deflects the reflective surface for different angles at different timings to form a plurality of different viewing regions.

9. The autostereoscopic projection device as recited in claim 1, wherein the light combining element is a total reflection prism.

10. The autostereoscopic projection device as recited in claim 4, wherein the light combining element is a total reflection prism.

11. A display device, comprising:
    the autostereoscopic projection device as recited in claim 1; and
    a display screen, wherein the autostereoscopic projection device forms a plurality of viewing regions on the display screen.

12. The display device as recited in claim 11, wherein the light source module is a laser array or a laser unit.

13. The display device as recited in claim 11, wherein the autostereoscopic projection device further comprising:
    a light uniforming module disposed between the light scanning module and the light source module, wherein the light is transmitted sequentially through the light uniforming module and the light scanning module.

14. The display device as recited in claim 11, wherein the light combining module further includes a second light combining element, the spatial light modulator module further includes a second spatial light modulator element and a third spatial light modulator element, after entering into the second spatial light modulator element and the third spatial light modulator element, the light is transmitted to the first light combining element by the second light combining element along the same direction.

15. The display device as recited in claim 11, wherein the light scanning module is a voice coil motor, polygon mirror, or MEMS lens.

16. The display device as recited in claim 11, wherein the spatial light modulator element is a digital micromirror device (DMD).

17. The display device as recited in claim 11, wherein the actuating device of the light scanning module deflects the reflective surface for different angles at different timings to form a plurality of different viewing regions.

18. The display device as recited in claim 11, wherein the light combining element is a total reflection prism.

19. The display device as recited in claim 11, wherein the display screen includes a double lenticular lens, and the double lenticular lens includes two lenticular lens layers and a 2D diffuser disposed between the lenticular lens layers.

* * * * *